United States Patent Office 2,971,017
Patented Feb. 7, 1961

2,971,017

PROCESS FOR THE PREPARATION OF CYCLOPENTADIENYL INDIUM COMPOUNDS

Ernst Otto Fischer, Munich-Solln, and Hermann P. Hofmann, Munich, Germany, assignors to Union Carbide Corporation, a corporation of New York No Drawing. Filed May 29, 1958, Ser. No. 738,604

Claims priority, application Germany June 7, 1957

12 Claims. (Cl. 260—429)

This invention relates to organometallic compounds of indium and to a method for preparing them. More particularly, the invention relates to cyclopentadienyl indium compounds prepared by the reaction of an alkali metal cyclopentadienide with an indium compound in an inert liquid organic solvent.

The compounds of this invention may be monocyclopentadienyl indium compounds or tricyclopentadienyl indium compounds. Heretofore, cyclopentadienyl compounds of indium were completely unknown. Further, the only known organic derivatives of indium were compounds of trivalent indium. It was therefore particularly surprising that by the method of this invention, it is possible to prepare organometallic compounds of monovalent indium in a simple manner.

The indium compounds of this invention may be represented by the formula $$InR_x$$

wherein R is a group selected from the class consisting of cyclopentadienyl and alkyl substituted cyclopentadienyl and $x$ is an integer having the values 1 and 3.

The reaction in accordance with the invention when using, for example, indium(III)-chloride and cyclopentadienyl-sodium, in all probability takes place in accordance with the following equation:

$$InCl_3 + 3NaC_5H_5 \xrightarrow{solvent} In(C_5H_5)_3 + 3NaCl$$

A part of the cyclopentadiene or substituted cyclopentadiene can be split off from the tricyclopentadienyl compounds of indium by removing the solvent and heating in vacuum. In this way, there are obtained readily volatile compounds of monovalent indium with cyclopentadiene or substituted cyclopentadiene, for example, In($C_5H_5$).

Compounds of indium which may be used as starting materials for the process in accordance with the invention, include salts of mono- and trivalent indium with inorganic or organic acids, as well as other indium compounds, for example, indium acetyl-acetonate. It has been found particularly advantageous to start with halides of trivalent indium, preferably its chloride or bromide.

The salts of indium are reacted in accordance with the invention with alkali metal compounds of cyclopentadiene or substituted cyclopentadiene. The preparation of these alkali compounds is carried out by known methods. As derivatives of cyclopentadiene which are suitable as starting materials for the method in accordance with the invention, there may be mentioned methyl, ethyl and dimethyl cyclopentadiene.

The reaction in accordance with the invention is advantageously carried out in an organic solvent. The use of polar solvents, the proton activity of which is less than that of cyclopentadiene or that of the cyclopentadiene derivative used has proven particularly advisable. Such preferred solvents include ethers of various structure, such as dioxan, diethyl ether, ethylene glycol dimethyl ether, diethylene glycol dimethyl ether, or tetrahydrofuran, as well as amines and piperidine.

The reaction may be carried out in the temperature range from about room temperature up to the boiling point of the solvent employed. Approximately stoichiometric quantities of reactants may be used, that is, about three moles of alkali metal cyclopentadienide per mole of indium (III) compound, although it is advantageous to use a slight stoichiometric excess of alkali metal compound.

The new organometallic volatile compounds of indium of this invention can be used for the preparation of extremely pure indium. With their aid, it is possible in a simple manner to remove the indium from those elements with which it occurs in nature and from which it can be purified only partially and with great difficulty by the previously known methods, thus obtaining the indium in a very pure state.

Furthermore, the new compounds can be used for the preparation of indium coatings. Such metal coatings are of increasing importance in electrical engineering. Thus, for instance, very pure indium in combination with metals of the 5th group of the periodic system such as arsenic and antimony is used for the production of transistors. The compounds prepared by the method of the invention have the advantage that the indium coatings made with them are characterized by particularly high purity.

Since the new volatile indium (I) compounds can readily be converted into the metal, high temperatures are not required to produce the metal coatings so that it is possible by means of these compounds to produce coatings of very pure indium even on those substrates (for instance plastic) which may not be exposed to high temperatures. The deposition of the metal coating is favored by light or traces of oxygen so that the heating of the object to be coated may not be necessary at all.

For the preparation of metal coatings, it is not necessary to prepare the volatile indium(I)-compound separately and isolate it. One can also proceed from the crude indium(III)-compound or the reaction mixture containing this compound by heating the compound in vacuum and using the vapors formed directly to produce the metal coating.

Example I

In a three-neck flask of a capacity of 500 ml. equipped with a stirrer, reflux condenser, excess pressure valve and dropping funnel, the air in which flask had been displaced by nitrogen, there was prepared in the customary manner a sodium cyclopentadienyl solution prepared from 1.2 grams sodium and 5 milliliters (abbreviated ml.) freshly distilled cyclopentadiene in 50 ml. of absolute tetrahydrofuran. To this solution there was added, drop by drop, while stirring, a solution of 2.2 grams anhydrous indium(III)-chloride in about 30 ml. of tetrahydrofuran over the course of about 15 minutes in which connection sodium chloride deposited as a fine precipitate, under slight heating. At the same time the color changed from light red to light yellow. After the total amount had been added, stirring was continued for an hour, followed by heating for about 5 minutes under reflux condenser. Thereupon the solvent was removed, the residue, which was very finely divided, was reprecipitated under nitrogen and finally subjected to sublimation in a high vacuum at 150° C. At an oil-bath temperature of 130° C., the first crystals of indium-(I) cyclopentadienyl appeared. The product was obtained in the form of colorless needles which had a pale yellowish green color in a thick layer and which could be resublimated under high vacuum at a temperature of 40 to 70° C. The yield was about 1 gram (55% of the theoretical yield).

Example II

In the apparatus described in Example I, 1.2 grams of sodium and 5 ml. of cyclopentadiene in 50 ml. of tetrahydrofuran were reacted, under nitrogen, to form sodium cyclopentadienyl. While stirring, a solution of 5.8 grams indium(III)-bromide in 30 ml. of tetrahydrofuran was added, drop by drop, followed by stirring for one hour and then by boiling under reflux for 5 minutes. Thereupon the solvent was withdrawn in high vacuum and the dry, yellow residue was subjected to high-vacuum sublimation (oil bath 130 to 180° C., 3 hours). The yield was 2.2 grams indium(I)-cyclopentadienyl (75% of the theoretical yield).

Example III

Similar to the preparation of sodium cyclopentadienyl in Examples I and II, 2 grams of potassium were reacted with 5 ml. of cyclopentadiene in 140 ml. of tetrahydrofuran to form potassium cyclopentadienyl. While stirring, 3.0 grams indium(III)-chloride, dissolved in 30 ml. tetrahydrofuran, were added, drop by drop, and boiled on a water bath for one half hour under reflux. The solvent was withdrawn in high vacuum, and the dry yellowish residue sublimated in a high vacuum. The yield was 0.9 gram indium(I)-cyclopentadienyl (37% of the theoretical yield).

Example IV

In the apparatus described in Example I, sodium cyclopentadienyl was prepared from 1.2 grams of sodium with 5 ml. of cyclopentadiene in 70 ml. of ethylene glycol dimethyl ether. There were added to this 2.2 grams of solid indium(III)-chloride, followed by boiling under reflux for a half hour with agitation. The solvent was withdrawn in a high vacuum and the residue subjected to sublimation. The yield was 1 gram of indium(I)-cyclopentadienyl (56% of the theoretical yield).

Example V

About 0.6 gram of sodium and 2.5 ml. of cyclopentadiene were reacted in the apparatus described in Example I in 70 ml. of dioxan to form sodium cyclopentadienyl. The temperature was in this preparation maintained at 70° C. by means of a water bath. After completion of the evolution of hydrogen, 1.7 grams solid indium(III)-chloride were added and the stirring was continued for a further 2 hours at 70° C. The solvent was withdrawn in a high vacuum and the residue subjected to sublimation. The yield was 0.95 gram indium(I)-cyclopentadienyl (69% of the theoretical yield).

What is claimed is:

1. A process for the production of indium compounds having the formula InR, wherein R is selected from the group consisting of cyclopentadienyl and lower alkyl-substituted cyclopentadienyl which comprises (1) reacting in approximately stoichiometric quantities a compound of trivalent indium selected from the group consisting of indium trichloride and indium tribromide with an alkali metal derivative of a member selected from the group consisting of cyclopentadiene and lower alkyl-substituted cyclopentadienes in a polar liquid organic solvent selected from the group consisting of ethers and amines to give a reaction mixture containing a compound of the formula $InR_3$, wherein R has the meaning defined hereinabove, (2) removing the solvent from said reaction mixture and (3) recovering said compound having the formula InR from said solvent-free reaction mixture by sublimation under vacuum at a temperature between about 130° C. and about 180° C.

2. Process in accordance with claim 1 wherein said alkali metal is sodium.

3. Process in accordance with claim 1 wherein said alkali metal is potassium.

4. Process in accordance with claim 1 wherein said R is cyclopentadienyl and said alkali metal derivative is derived from cyclopentadiene.

5. Process in accordance with claim 1 wherein said R is methylcyclopentadienyl and said alkali metal derivative is derived from methylcyclopentadiene.

6. Process in accordance with claim 1 wherein said R is ethylcyclopentadienyl and said alkali metal derivative is derived from ethylcyclopentadiene.

7. Process in accordance with claim 1 wherein said solvent is tetrahydrofuran.

8. Process in accordance with claim 1 wherein said solvent is diethyl ether.

9. Process in accordance with claim 1 wherein said solvent is ethylene glycol dimethyl ether.

10. Process in accordance with claim 1 wherein said solvent is dioxan.

11. A process for the production of indium cyclopentadienyl which comprises reacting indium trichloride with sodium cyclopentadienyl in tetrahydrofuran to give a reaction mixture containing indium tricyclopentadienyl, removing the solvent from said reaction mixture and recovering indium cyclopentadienyl from the solvent-free reaction mixture by sublimation under vacuum at about 150° C.

12. A process for the production of indium cyclopentadienyl which comprises reacting indium tribromide with sodium cyclopentadienyl in tetrahydrofuran to give a reaction mixture containing indium tricyclopentadienyl, removing the solvent from said reaction mixture and recovering the indium cyclopentadienyl from the solvent-free reaction mixture by sublimation under vacuum at between about 130° C. and about 180° C.

References Cited in the file of this patent

FOREIGN PATENTS 1,080,357    France _____ May 26, 1954

OTHER REFERENCES

Birmingham et al.: "Naturwissenschaften," vol. 42, 1955, page 96 relied on.